United States Patent [19]

Severson et al.

[11] Patent Number: 5,770,996
[45] Date of Patent: Jun. 23, 1998

[54] TRANSFORMER SYSTEM FOR POWER LINE COMMUNICATIONS

[75] Inventors: Paul K. Severson, Hampton; Richard M. Meidl, Grove Heights, both of Minn.

[73] Assignee: Interactive Technologies, Inc., North Saint Paul, Minn.

[21] Appl. No.: 705,802

[22] Filed: Aug. 30, 1996

[51] Int. Cl.⁶ .................................................. H04B 1/00
[52] U.S. Cl. .......................... 340/310.08; 340/310.07; 340/310.05; 361/268; 323/355; 307/17; 307/127; 375/258
[58] Field of Search .................. 340/310.01, 310.08, 340/310.05, 310.07; 361/623, 268, 68, 81, 270; 323/361, 355, 358; 375/258, 259; 307/40, 115, 17, 3, 127

[56] References Cited

U.S. PATENT DOCUMENTS

| | | | |
|---|---|---|---|
| 3,558,902 | 1/1971 | Casey | 307/3 |
| 4,114,141 | 9/1978 | Travis | 340/825.54 |
| 4,200,862 | 4/1980 | Campbell et al. | 340/310.01 |
| 4,357,605 | 11/1982 | Clements | 340/325.14 |
| 4,418,333 | 11/1983 | Schwarzbach et al. | 340/310.01 |
| 4,445,222 | 4/1984 | Smitt | 375/258 |
| 4,473,817 | 9/1984 | Perkins | 340/310.05 |
| 4,475,209 | 10/1984 | Urden | 375/258 |
| 4,628,440 | 12/1986 | Thompson | 364/140 |
| 4,638,299 | 1/1987 | Campbell | 340/310.04 |
| 4,697,166 | 9/1987 | Warnagiris et al. | 340/310.03 |
| 4,772,870 | 9/1988 | Reyes | 340/310.02 |
| 5,005,187 | 4/1991 | Thompson | 375/340 |
| 5,210,519 | 5/1993 | Moore | 375/258 |
| 5,227,762 | 7/1993 | Guidette et al. | 340/310.03 |
| 5,365,154 | 11/1994 | Schneider et al. | 318/103 |
| 5,491,463 | 2/1996 | Sargeant et al. | 340/310.01 |
| 5,528,630 | 6/1996 | Ashley et al. | 375/258 |

OTHER PUBLICATIONS

Dave Rye, "Technical Note: The X–10 Powerhouse Power Line Interface Model #PL513 and Two–Way Power Line Interface Model #TW52," Revision 2.4, Aug. 26, 1997.

*Primary Examiner*—Donnie L. Crosland
*Attorney, Agent, or Firm*—Fish & Richardson P.C., P.A.

[57] ABSTRACT

A transformer system couples a control panel with a power line to support two-way communications over the power line. A first transformer steps-down the power line voltage, supplying power to the control panel. A second transformer and associated capacitors provide a low impedance path at the communication signal frequencies and a high impedance path at the power frequency.

8 Claims, 4 Drawing Sheets

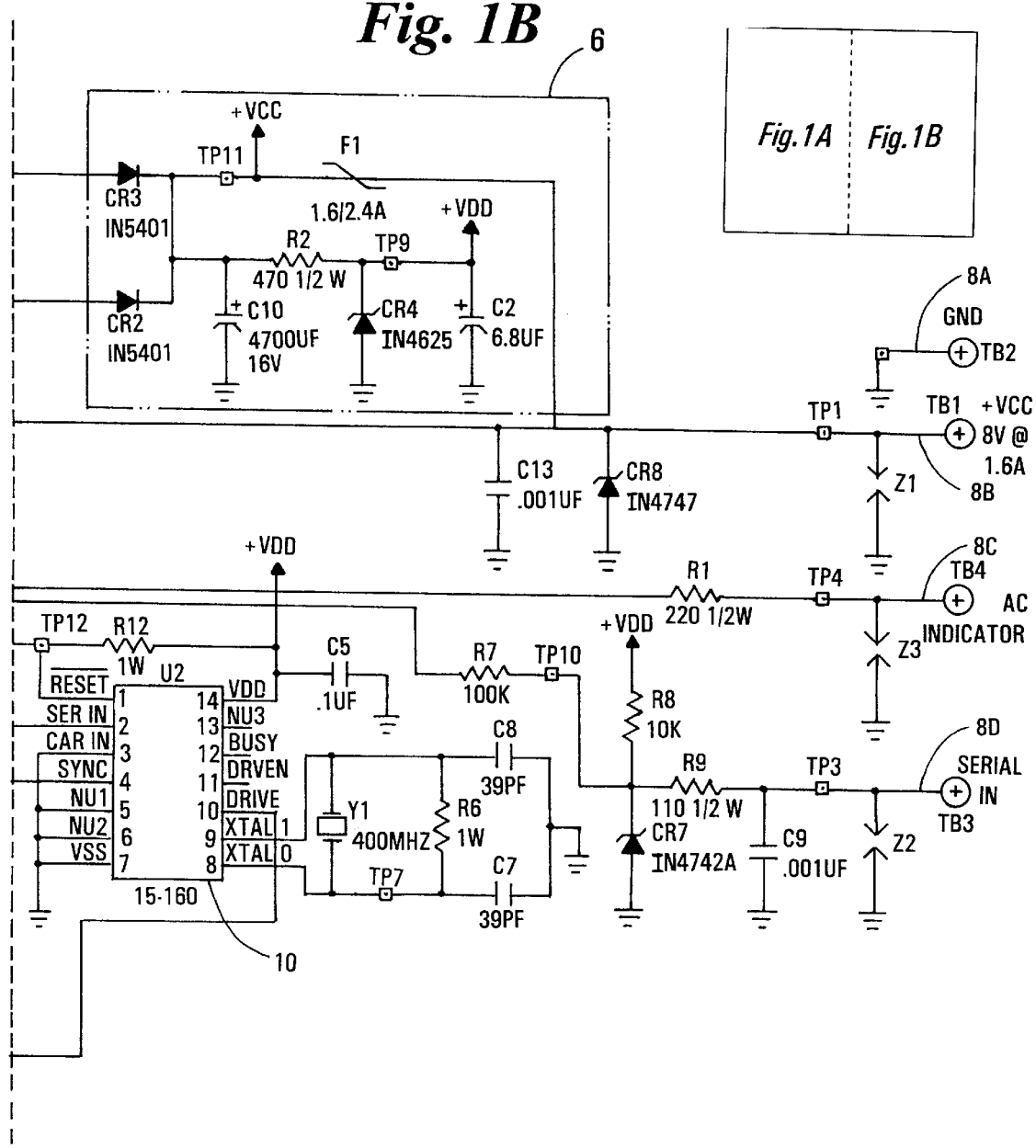

TRANSFORMER SYSTEM FOR POWER LINE COMMUNICATIONS

BACKGROUND OF THE INVENTION

The present invention relates to a transformer system for power line communications.

Power line communication systems exploit the existing power line wiring in a home or other facility for communication purposes. The local power line in a typical U.S. home or business supplies 110 volt AC, 60 Hz power. Other countries have similar systems that supply power at various voltage and frequency levels. The existing power line wiring may be used for transmitting information within the home or business, thereby eliminating the need for additional wiring.

One application of power line communication is in a security or monitoring system. The security system includes a plurality of sensors, controls, and alarms positioned in and around an area to be protected. One or more of these devices may be connected with the local power line through a standard wall plug or other connector. A control panel is also connected to the local power line through a standard plug or other connector. The power line supplies power to the control panel. Also, the power line is used to send information from the control panel to one or more of the devices connected to the power line.

A transformer system may be used to couple the control panel with the power line. The transformer isolates the power line from the control panel and conditions the power on the power line for use by the control panel. One example of a power line coupling transformer system is shown in FIG. 1.

An AC power line 2 is coupled with the primary winding of first transformer, T1, to provide power to a control panel (not shown). The control panel is connected with the transformer system by lines 8A–8D. Transformer T1 is rated at 10 volt-amps. A power conditioning circuit 6 converts the AC power to about 8 volts DC, which is transmitted to the control panel by lines 8A, 8B.

A signal generator 10 receives serial data from the control panel on line 8D and, with associated circuitry, generates a frequency-modulated signal which is placed on the secondary winding of transformer T2. The signal is transferred to the primary winding of transformer T2, which is connected with power line 2. There is no circuitry for receiving an information signal from power line 2 and sending the signal to the control panel. Line 8C provides an AC signal to the control panel for synchronization.

Present transformer systems, such as the transformer system shown in FIG. 1, have several limitations. First, the connection between the control panel and transformer system requires four lines or wires. The wires are typically exposed, e.g., along a wall. Therefore, there is a risk of damaging or disabling the security system by damaging one or more of the four wires, as well as the cost of stringing four wires.

Also, the total size and weight of a transformer system that may be connected at a standard wall plug is limited according to UL requirements. The extensive circuitry required to generate the communication signal, such as the circuitry shown in FIG. 1, consumes valuable space and adds weight, thereby reducing the size of the transformers that may be used in the system. For example, transformer T1 as shown in FIG. 1 may be restricted to 10 volt-amps due to the size and weight of the associated circuitry, when it may be desirable to have a larger transformer, e.g., 40–50 volt-amps. The circuitry also increases the cost of the coupling transformer system.

Also, coupling transformer systems, such as the one shown in FIG. 1, allow only one-way communication from the control panel to the other devices. Finally, the coupling transformer systems support only one communication protocol.

SUMMARY OF THE INVENTION

In accordance with the present invention, a power line communication transformer system is provided. The transformer system includes a first transformer having a primary winding connected with a power line and a secondary winding connected with a communication device. In one embodiment, the communication device is a control panel for a security system. A second transformer has a primary winding connected in series with the primary winding of the first transformer and a secondary winding connected in parallel with the secondary winding of the first transformer. A first capacitor is connected in series with the secondary winding of the second transformer and in parallel with the secondary winding of the first transformer. A second capacitor is connected in series with the primary winding of the second transformer and in parallel with the primary winding of the first transformer.

The communication device sends and receives signals at a first frequency range, and the power line transmits power at a second frequency. The values of the first and second capacitors are selected so that the second transformer provides a low impedance path at the first frequency range and a high impedance path at the second frequency. Additionally, a fuse may be connected in series with the secondary winding of the first transformer.

The present invention provides several advantages. The present invention provides a transformer system that is flexible, supporting different communication protocols. The present invention allows for larger transformers to be used without increasing the overall size and weight of the transformer system. The transformer system of the present invention is less expensive due to the elimination of complex circuitry and associated circuit components. The present invention requires only two wires for connection with the control panel, reducing cost and exposure to damage. Other advantages and features will become apparent from the following description and claims.

DESCRIPTION OF THE PREFERRED EMBODIMENTS

Figure 1A:
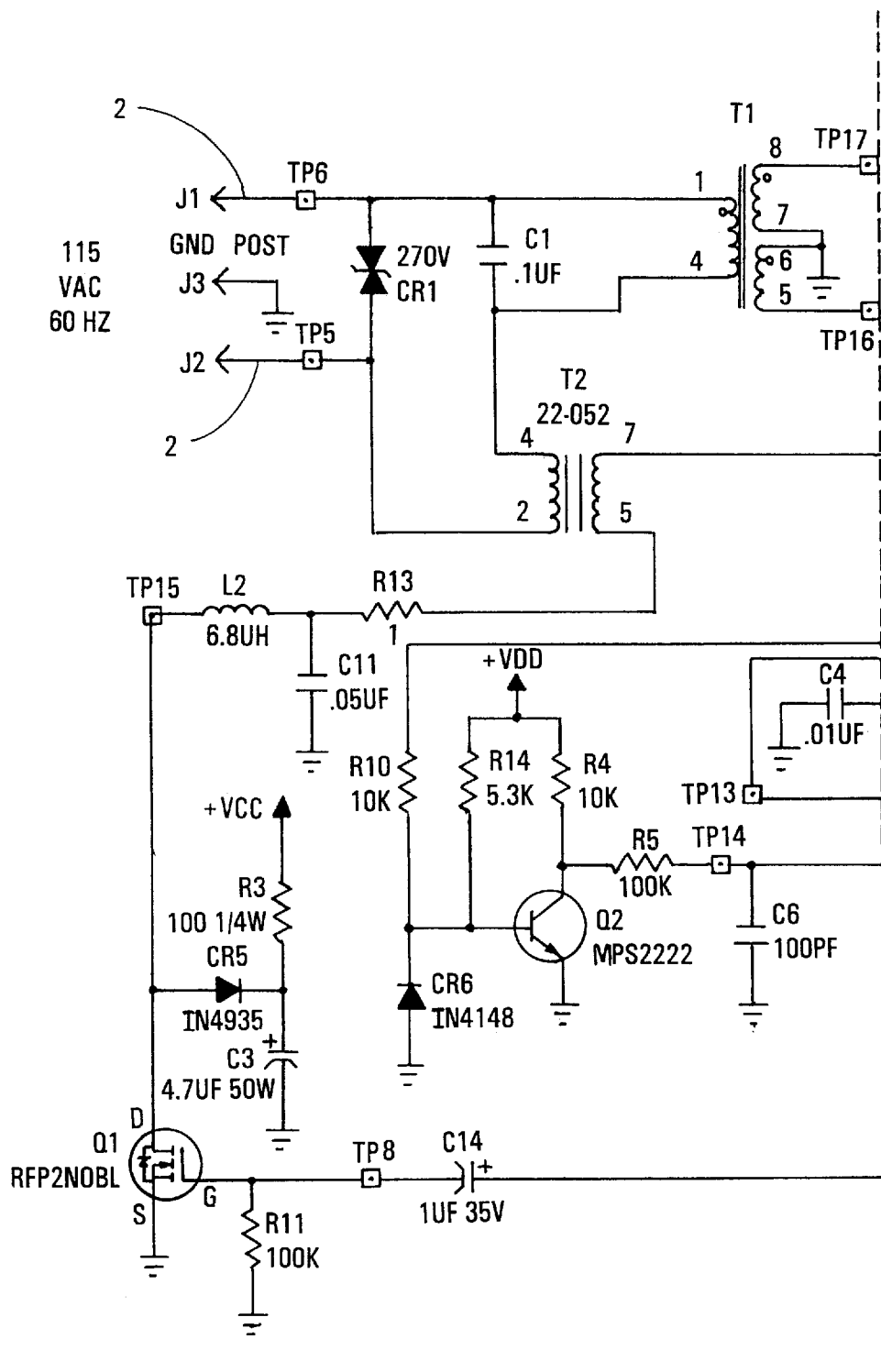
FIG. 1 shows a diagram of a transformer system.
Figure 2:
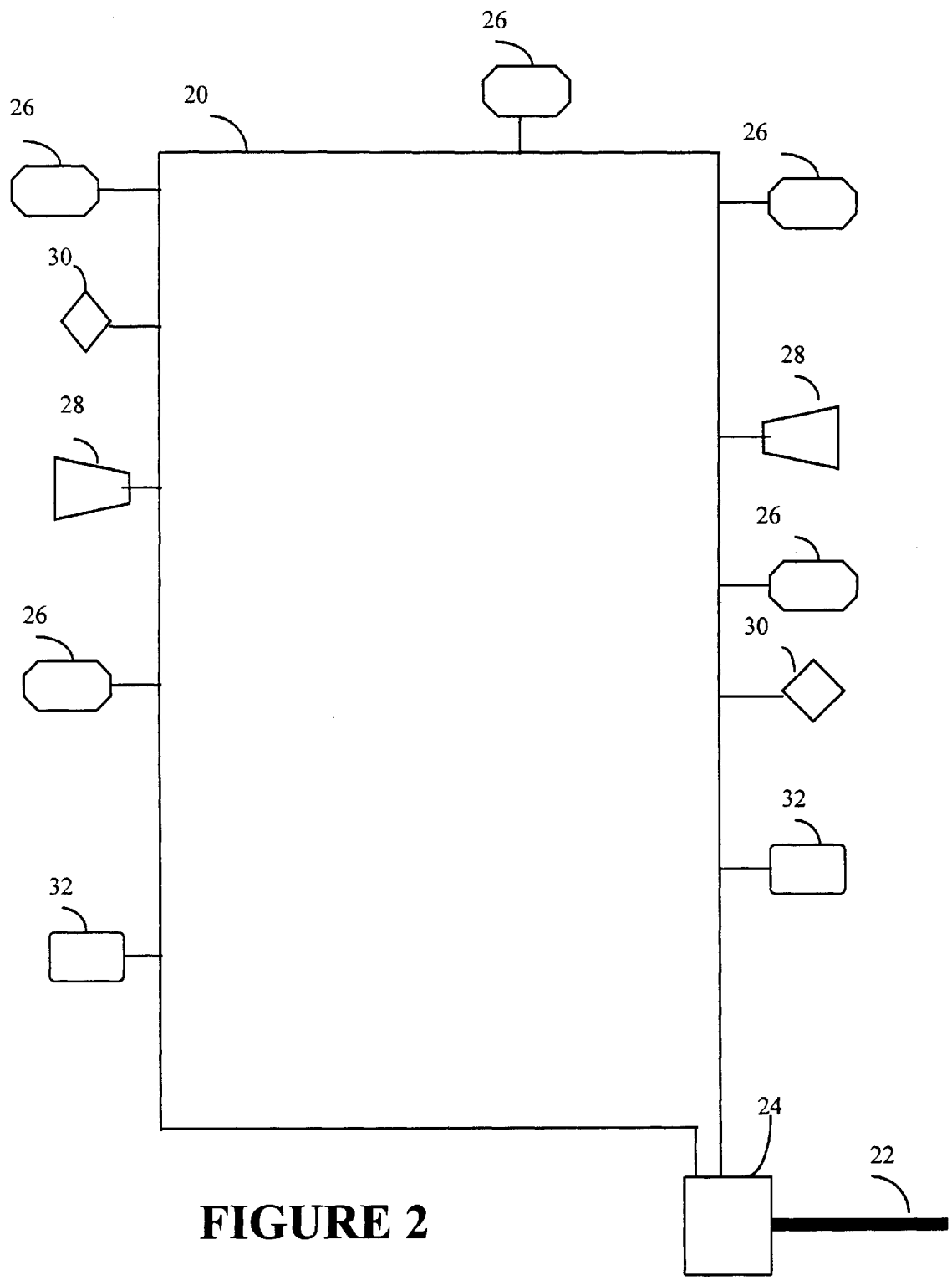
FIG. 2 shows a diagram of a local security system.

A diagram of a security system that uses a power line for communication is shown in FIG. 2. An area, e.g., a home, has a local power line 20 that is coupled to a supply power line 22 at junction 24. The security system also may be located in a variety of facilities, e.g., businesses, warehouses, etc.

Various sensors 26 are positioned throughout areas to be monitored. The sensors 26 may be one of a wide variety of known sensors, including motion detectors, door/ window sensors, smoke detectors, and heat detectors. Also, one or more alarm devices 28, e.g., sirens, are also positioned in or near the monitored area. Additionally, one or more controls 30, e.g., a light switch control, may also be positioned in the area. Each of the above-described devices are connected to the local power line through standard two-prong (or three-prong) wall plugs or other connectors.

One or more control panels 32 are also connected to the local power line 20 through a wall plug. A control panel 32 allows the users of the security system to program the system and activate/deactivate the system. Also, control panel 32 monitors the sensors 26 in the system and receives a signal when a sensor is activated. The control panel may then activate one or more local alarm devices 28 (e.g., siren, voice, visual) and/or transmit the sensor information to a remote agency, e.g., fire department, police, or monitoring station. The remote transmission may be by phone or wireless communication. Also, control panel 32 may be used to activate one or more controls 30, e.g., to turn on/off a light or activate a sound recording. The activation of controls 30 may be part of the response to a sensor activation or independent of the sensors.

Information is transmitted to and from control panel 32 over local power line 20. Various communication protocols have been developed for power line communications. One known protocol, which we will refer to as the "X-10 Code Format," was developed by Pico Electronics Ltd. of Fife, Scotland, and is used by X-10 Home Controls Inc. of Northvail, N.J. This format is disclosed in U.S. Pat. Nos. 4,200,862; 4,628,440; and 4,638,299, all of which are incorporated herein by reference. In the X-10 Code Format, transmissions are synchronized to the zero-crossing point of the AC signal on local power line 20. A binary "1" is represented by a 1 msec burst of 120 kHz and a binary "0" is represented by the absence of a 120 kHz burst.

Another communication protocol was developed by Interactive Technologies, Inc., assignee of the present invention. In this protocol, a 10K baud, frequency-modulated signal is used. A binary "1" is represented by 270 kHz frequency signal and a binary "0" is represented by a 235 kHz frequency signal. A start sequence is used for each transmission, consisting of 800 msec of a logical "1", 700 msec of a logical "0", and 100 msec of a logical "1". There are 32 bits of data in each transmission. The first byte is a house (or facility) code. The second byte is a siren control. The third bit is an arming level and nibblewise checksum. The fourth byte is a bytewise checksum. All bytes are transmitted with the most significant bit first. The total time for a transmission is about 4.8 msec. The transmissions should be centered about the zero-crossing on the AC signal.

Other communication protocols may also be used with the present invention. One such protocol is the industry standard Consumer Electronics (CE) bus protocol.

Figure 3:
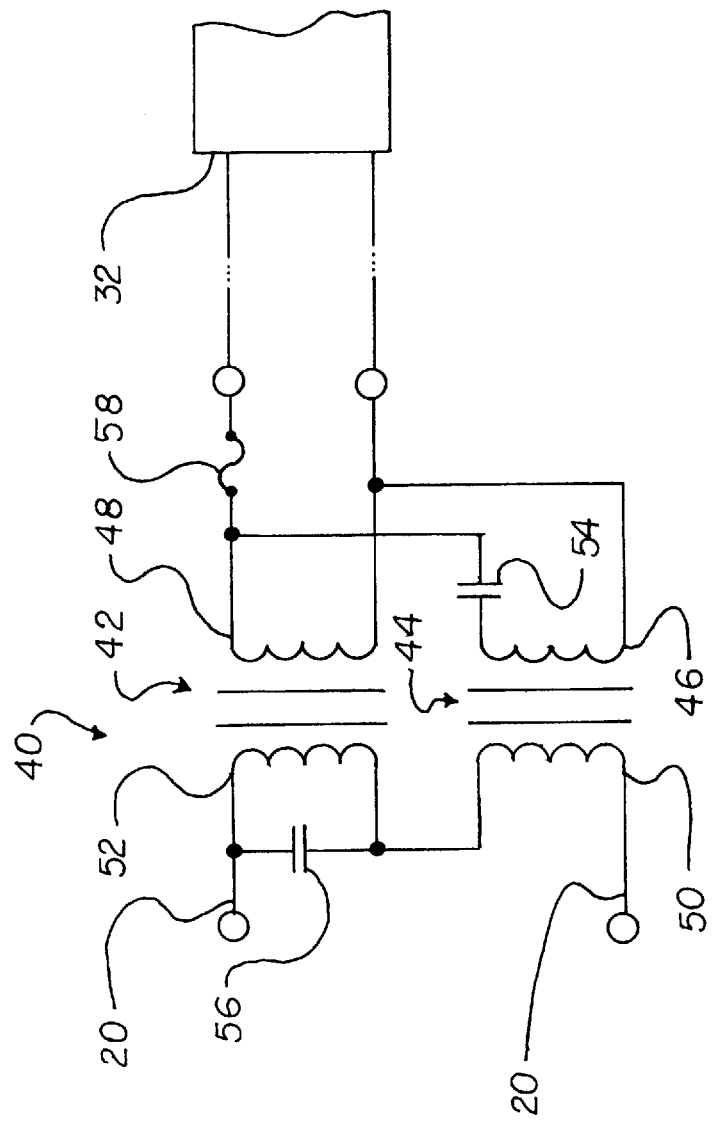
FIG. 3 shows a diagram of a transformer system according to the present invention.

The information sent between control panel 32 and the remaining devices in the security system, 26, 28, and 30, is transmitted on local power line 20. A transformer system 40 couples the control panel 32 with power line 20, as shown in FIG. 3. Transformer system 40 includes two transformers, 42, 44, respectively. Transformer 42 is a step-down transformer that steps down the voltage on power line 20 to a lower voltage level, suitable for supplying power to control panel 32. For example, in a typical U.S. system, the 110 volt AC signal is stepped down to a 9 volt or 16 volt signal. A rectifying circuit (not shown), such as a bridge rectifier circuit, is associated with control panel 32 to convert the stepped-down 9 or 16 volt signal to a DC signal.

Transformer 44 provides the communication pathway for communication transmissions between control panel 32 and security system devices 26, 28, and 30 on power line 20. The primary-to-secondary turns ratio in transformer 44 is 1:1. The secondary winding 46 of transformer 44 is connected in parallel with the secondary winding 48 of transformer 42. The primary winding 50 of transformer 44 is connected in series with the primary winding 52 of transformer 42.

A first capacitor 54 is connected in series with the secondary winding 46 of transformer 44 and in parallel with the secondary winding 48 of transformer 42. A second capacitor 56 is connected in series with primary winding 50 of transformer 44 and in parallel with primary winding 52 of transformer 42.

A fuse 58 or other circuit-breaking device may be connected in series with secondary windings 46 and 48 to prevent surges in the power line signal from damaging control panel 32.

The capacitance value of capacitors 54 and 56 are selected so that the path through transformer 44 is a relatively low impedance path at the communication signal frequencies and a relatively high impedance path at the power line frequency. Therefore, transformer 44 provides the power line coupling for the communication signals and transformer 42 provides the coupling for the power supplied to control panel 32.

In one embodiment of the invention, the capacitance values of capacitors 54 and 56 are selected so that transformer system 40 will enable two-way communications of both the X-10 Code Format and the Interactive Technologies protocol (and any other protocol that operates within about 100 kHz to about 270 kHz). In one embodiment, capacitor 54 is selected to have a capacitance of 2.2 $\mu$F and capacitor 56 is selected to have a capacitance of 0.10 $\mu$F.

The present invention provides several advantages. As described above, transformer system 40 supports multiple communication protocols. Once the frequency range for the communication protocol is determined, capacitors 54, 56 are selected to provide a relatively low impedance path for the communication signals through transformer 44. At the power line frequency, capacitors 54, 56 provide a high impedance path through transformer 44. Therefore, the power line signal is directed through transformer 42 to supply energy to control panel 32.

Also, two-way communication is supported by transformer system 40. Further, as shown in FIG. 3, transformer system 40 includes transformers 42, 44 and capacitors 54, 56; no other local circuitry is required. Therefore, larger transformers 42, 44 may be used. The elimination of additional circuitry in transformer system 40 also reduces the overall cost of system 40. Also, only two wires are needed to connect transformer system 40 with control panel 32, reducing cost, complexity, and other problems associated with stringing multiple wires between the wall plug and control panel.

Other embodiments are within the scope of the following claims.

What is claimed is:

1. A system for coupling a communication device with a power line, comprising:

a first transformer having a primary winding connected with the power line and a secondary winding connected with the communication device;

a second transformer having a primary winding connected in series with the primary winding of the first transformer and a secondary winding connected in parallel with the secondary winding of the first transformer;

a first capacitor connected in series with the secondary winding of the second transformer and in parallel with the secondary winding of the first transformer; and a second capacitor connected in series with the primary winding of the second transformer and in parallel with the primary winding of the first transformer.

2. The system of claim 1, wherein the communication device is a security system control panel.

3. The system of claim 1, wherein the first transformer is a step-down transformer.

4. The system of claim 1, wherein the second transformer is a one-to-one transformer.

5. The system of claim 1, wherein the communication device sends and receives signals at a first frequency range, the power line transmits power at a second frequency, and the values of the first and second capacitors are selected so that the second transformer provides a low impedance path at the first frequency range and a high impedance path at the second frequency.

6. The system of claim 1, wherein the first capacitor is about 2 microfarads.

7. The system of claim 1, wherein the second capacitor is about 0.10 microfarads.

8. The system of claim 1, further comprising a fuse connected in series with the secondary winding of the first transformer.

* * * * *